(12) United States Patent
Chatain et al.

(10) Patent No.: US 12,384,621 B2
(45) Date of Patent: Aug. 12, 2025

(54) BIN STORAGE SYSTEM COMPRISING ROBOTS EQUIPPED WITH HOOKS OR FINGERS FOR GRIPPING AND LIFTING BINS AND METHOD OF GRIPPING BINS THEREFOR

(71) Applicant: EXOTEC PRODUCT FRANCE, Croix (DE)

(72) Inventors: Marc Chatain, Zimmerbach (FR); Romain Moulin, Lille (FR); Renaud Heitz, Villeneuve d'Ascq (FR)

(73) Assignee: EXOTEC PRODUCT FRANCE, Croix (FR)

( * ) Notice: Subject to any disclaimer, the term of this patent is extended or adjusted under 35 U.S.C. 154(b) by 392 days.

(21) Appl. No.: 18/042,535

(22) PCT Filed: Aug. 31, 2021

(86) PCT No.: PCT/EP2021/074059
§ 371 (c)(1),
(2) Date: Feb. 22, 2023

(87) PCT Pub. No.: WO2022/043589
PCT Pub. Date: Mar. 3, 2022

(65) Prior Publication Data
US 2023/0331478 A1 Oct. 19, 2023

(30) Foreign Application Priority Data
Aug. 31, 2020 (FR) .................................... 2008857

(51) Int. Cl.
*B65G 1/04* (2006.01)
*B65G 1/06* (2006.01)

(52) U.S. Cl.
CPC ........... *B65G 1/0464* (2013.01); *B65G 1/065* (2013.01)

(58) Field of Classification Search
CPC ...... B65G 1/065; B65G 1/0464; B65G 47/90; B65G 47/907; B65G 77/12; B66C 1/101; B66C 1/663
See application file for complete search history.

(56) References Cited

U.S. PATENT DOCUMENTS 4,815,781 A    3/1989  No et al.
10,829,302 B2 * 11/2020  Lindbo ................. B65G 57/03
(Continued)

FOREIGN PATENT DOCUMENTS

CN    110329696 A    10/2019
EP    0 767 113 A2   4/1997
(Continued)

OTHER PUBLICATIONS

International Search Report dated Dec. 23, 2021 for corresponding International Application No. PCT/EP2021/074059, filed Aug. 31, 2021.
(Continued)

*Primary Examiner* — Glenn F Myers
(74) *Attorney, Agent, or Firm* — David D. Brush; Westman, Champlin & Koehler, P.A.

(57) ABSTRACT

An automatic product storage and retrieval system including: a bin storage facility having a plurality of storage columns arranged in a grid and configured to receive a vertical stack of bins; and at least one robot having a gripping and lifting element for gripping and lifting at least one bin and a mobile support configured to slide vertically around the bins. The gripping and lifting element includes at least one hook mounted so as to pivot with respect to the support or a finger guided in translation in a horizontal slide cooperating with one or more return springs. The bins have at least one lug with a locking housing for the hook substantially turned downwards and a tilted portion substantially turned upwards enabling a free end of the hook or of (Continued)

the bin to be pushed back towards the outside of the bin when the support moves downwards.

14 Claims, 7 Drawing Sheets

(56) References Cited

U.S. PATENT DOCUMENTS

2017/0129702 A1* 5/2017 Hognaland .......... B65G 1/0464
2020/0346864 A1* 11/2020 Fjeldheim ............... B66C 1/101
2021/0179351 A1* 6/2021 Austrheim ........... B65G 1/0428

FOREIGN PATENT DOCUMENTS

NO          317366 B1    10/2004
WO      2013167907 A1    11/2013

OTHER PUBLICATIONS

Written Opinion of the International Searching Authority dated Dec. 23, 2021 for corresponding International Application No. PCT/EP2021/074059, filed Aug. 31, 2023.

English translation of the Written Opinion of the International Searching Authority dated Dec. 23, 2021 for corresponding International Application No. PCT/EP2021/074059, filed Aug. 31, 2023.

* cited by examiner

BIN STORAGE SYSTEM COMPRISING ROBOTS EQUIPPED WITH HOOKS OR FINGERS FOR GRIPPING AND LIFTING BINS AND METHOD OF GRIPPING BINS THEREFOR

CROSS-REFERENCE TO RELATED APPLICATIONS

This application is a Section 371 National Stage Application of International Application No. PCT/EP2021/074059, filed Aug. 31, 2021, the content of which is incorporated herein by reference in its entirety, and published as WO 2022/043589 on Mar. 3, 2022, not in English.

1. FIELD OF THE INVENTION

The field of the invention is that of warehouse logistics, and in particular the automatic storage and retrieval of products.

More specifically, the invention concerns a product storage and retrieval system.

The invention has particular application in the storage of products in ware-houses.

2. STATE OF THE ART

Automated structures for storing bins containing products in a three-dimensional grid are known, for example from document NO317366 B1, in which the bins are stored on top of each other in columns to which rails have been attached to allow the movement of robots to pick up or drop off a bin in a column and transport it on the grid-like rail network to another storage column or collection point, where for example the bin is transferred onto a conveyor or into a lift.

To pick up a bin from a column, document NO317366 B1 suggests to implement a platform suspended by cables that can be moved vertically, equipped with gripping clips that allow the bin placed at the top of the stack of bins stored in the column to be picked up by its upper part.

A shortcoming of this known technique is that it only allows one bin to be removed from a storage column at a time. This limitation is particularly detrimental when it is desired to remove a bin located under several bins in a stack. It is then necessary to remove one by one each of the bins placed above the bin to be able to access the bin to be picked and to store them temporarily out-side the column, which significantly increases the overall time required to pick the target bin and may cause difficulties for the robots to circulate on the grid due to the presence of the bins that have been removed to access the target bin and that are waiting to be deposited back in the column. In addition, this known technique does not allow for multiple target bins stacked on top of each other to be picked in a single operation.

In order to overcome this shortcoming, a frame or arms have been designed which can be slid along a stack of bins and which are equipped with claws so that they can grip a bin in the stack which is located under one or more bins and lift this bin and the bins above it in a single movement.

EP 0 767 113 A2 describes a robot with such a lifting frame, the frame of which is shaped like a rectangular tube. A shortcoming of this tube-shaped frame is that its height corresponds to the height of the maximum stack of bins that can be stored in a column, so that this maximum stack can be picked up in one operation, which restricts its use in a warehouse where the height may not be sufficient.

WO 2013/167907 A1 also describes a robot with arms equipped with grippers for picking up a stack of several bins in a column.

A shortcoming of these known clamp frame or arm techniques is that there is a risk of failure of the hydraulic, pneumatic or electrical control systems to operate the clamps, requiring intervention to repair the robot and disrupting or even shutting down the storage facility.

Another shortcoming of these known techniques is that they are complex to implement and require significant maintenance.

3. STATEMENT OF THE INVENTION

These objects, and others that will appear later, are achieved with the help of an automatic product storage and retrieval system comprising:
  a plurality of bins for receiving said products;
  a storage facility for said bins comprising a plurality of storage columns arranged in a grid and configured to receive a vertical stack of said plurality of bins, and
  at least one robot operating above said grid, capable of transporting said bins and picking up and depositing said bins in said columns, said robot comprising means for gripping and lifting at least one bin comprising a mobile support, such as a frame or an arm, configured so as to be able to slide vertically around said bins.

According to the invention, said means for gripping and lifting at least one bin comprise at least one substantially vertically extending element, mounted movably with respect to said support between:
  a stable equilibrium position in which the lower end of said member is not subject to the action of any horizontal thrust or the resultant of the horizontal thrust forces acting on the lower end of said member is zero; and
  at least one out-of-equilibrium position, in which the resultant of the horizontal thrust forces on the lower end of said member is non-zero, and the lower end of said member is displaced to either side of its position in said equilibrium position.
and said bins have at least one lug having a housing for locking said movable member in said stable equilibrium position, substantially facing downwards and a substantially upwardly facing tilted portion for pushing the lower end of said movable member outwards from said bin, in one of said out-of-equilibrium positions, when said support moves downwards.

The invention thus suggests, in a novel and clever way, to implement a support on which is mounted at least one element that is mobile in relation to it and can be moved away from a stable equilibrium position in order to pick up a stack of bins from a storage column and lift it. This technical solution is particularly advantageous because, in addition to its ease of use and efficiency, it is very reliable and requires no maintenance.

In the context of the invention, the support may take the form of a frame, one or more plates, a frame that may surround a bin on at least three sides, or an arm. This support may be in one piece or made up of several separate parts.

It should also be noted that the lock housing can take any hollow shape, for example a concave shape or a hollow triangle shape, . . . , without departing from the scope of the invention.

In an advantageous embodiment of the invention, said movable element is a hook intended to hang from said support, pivotally mounted about an axis relative to said support.

In another advantageous embodiment of the invention, said movable element is a finger guided in translation in a horizontal slide and cooperating with one or more return springs in said stable equilibrium position.

In particular embodiments of the invention, it may be envisaged that said means for gripping and lifting at least one bin comprises two or three movable members, and that said lugs have two or three lugs, said lugs being positioned relative to each other so that when said support moves around a bin or stack of bins each of said movable members is substantially opposite one of said lugs of the bin or bins in the stack.

In a particular embodiment of the invention, said means for gripping and lifting at least one bin comprises four movable members and said lugs have four lugs, said lugs being positioned relative to each other so that when said support moves around a bin or stack of bins each of said movable members is substantially opposite one of said lugs of the bin or bins of the stack.

According to a particular aspect of the invention, said movable element is mounted substantially at one end or corner of said support.

In advantageous embodiments of the invention in which said means for gripping and lifting at least one bin comprises a plurality of movable members, said members are each mounted substantially at a different end or corner of said support.

In an advantageous embodiment of the invention, said locking lug is formed integrally with said bins.

In a particular embodiment of the invention, said hook is formed by a rod having a lug protruding on one side substantially at the free end of said rod.

According to a particular aspect of the invention, said tilted portion comprises a tilted plane.

According to a particular embodiment of the invention, said locking housing has a curvature in the form of a hyperbolic branch, a parabola or a truncated ellipse.

Advantageously, said bins have guiding stops opposite to said locking housings for pushing said movable element against said locking housing.

In particular embodiments of the invention where said means for gripping and lifting at least one bin comprises a single movable element, provision may be made for the use of guides, for example attached to or formed on the uprights, to guide the corners of the bins. It may also be possible to attach or form the lug to the lower part of the bins.

In a particular embodiment of the invention, said gripping and lifting means comprise at least one rack or a plurality of cables attached to said support and means for actuating said rack or said cables to raise or lower said support.

Advantageously, the chassis of said robot has an opening allowing the passage of said support through said chassis in order to be able to lift a bin or a stack of bins from the top of said chassis or vice versa to deposit a bin or stack in a column under said robot through said opening.

The invention also relates to a method of gripping by a robot a stack of bins in a storage column of a storage facility comprising a plurality of storage columns arranged in a grid, said robot operating above said grid and comprising means for gripping and lifting at least one bin comprising a movable support configured so as to be able to slide vertically around said bins and at least one element movable with respect to said support, and preferably four elements movable with respect to said support, between:

a stable equilibrium position in which the lower end of said movable member is not subject to the action of any horizontal thrust or the resultant of the horizontal thrust forces acting on the lower end of said member is zero; and at least one out-of-equilibrium position, in which the resultant of the horizontal thrust forces acting on the lower end of said movable member is non-zero, and the lower end of said member is moved to either side of its position in said equilibrium position, said bins in said stack having at least one, and preferably four, lugs, having a substantially downwardly facing locking housing for said movable member and a substantially upwardly facing tilted portion for pushing the free end of said movable member outwardly of said bin as said support moves downwardly.

It should be noted that in the context of the invention, the stack of bins may consist of all the bins in the stack of bins stored in the column, or only a top part of the stack of bins stored in the column.

According to the invention such a method comprises the following steps:

moving said support around downwardly around said stack to a height at the bottom of the stack where said movable member is engaged in said locking housing of said bottom of the stack;

from said height, moving said support up to the upper level of said column, causing said stack to be lifted out of said column.

5. LIST OF FIGURES

Other features and advantages of the invention will become clearer on reading the following description of two embodiments of the invention, given as simple illustrative and non-limiting examples, and of the appended drawings, among which are the following

4. DETAILED DESCRIPTION OF THE INVENTION

Figure 1:
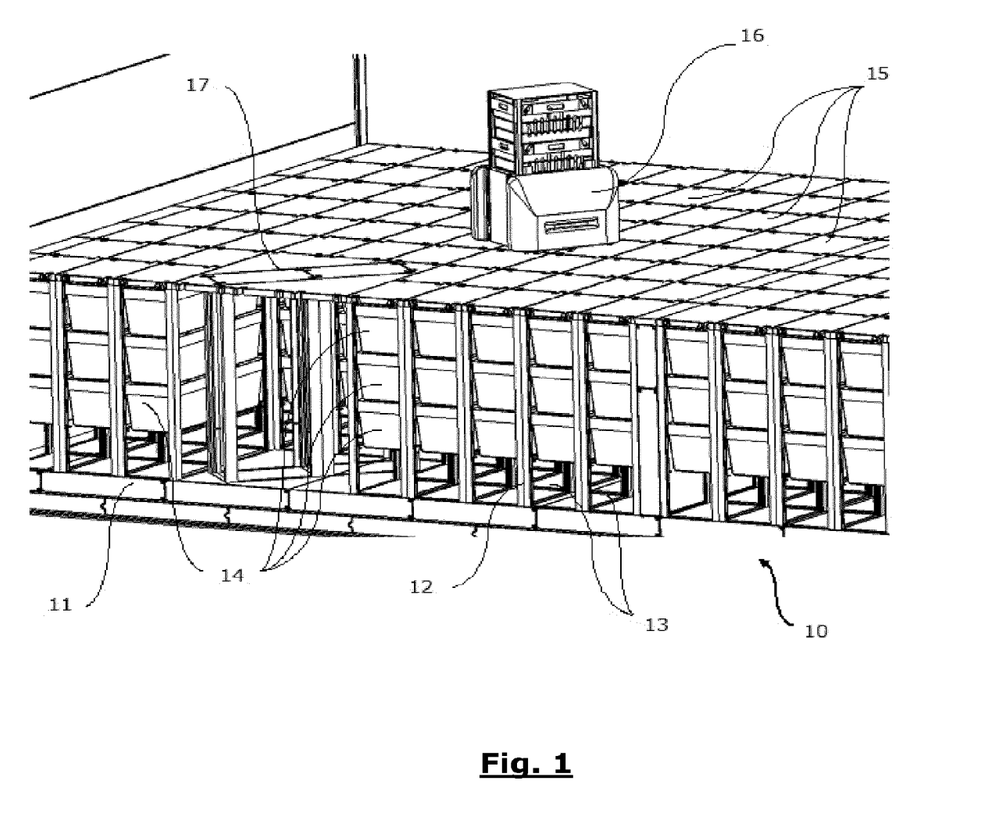
FIG. 1 is a perspective view of an example of an embodiment of a product storage and retrieval system according to the invention.

FIG. 1 illustrates, in a perspective view, an example of an automated product storage and retrieval system according to the invention implemented within a warehouse.

This system 10 comprises a storage facility 11 formed by uprights 12 arranged in the plane of a grid, delimiting juxtaposed storage columns 13, or cells, for storing bins 14 stacked on top of each other.

In this particular embodiment of the invention, covers 15 close off the top opening of the columns 13. When tilted flat, they rest on horizontal beams and crosspieces connecting the upper ends of the uprights 12 in the longitudinal and transverse directions and form a rolling platform for self-guided robots 16 for transporting the bins and for depositing or removing one or more bins from a column.

These covers 15 are also pivotally mounted to allow access to the bins stored under them in a column. These covers 15 can be tilted vertically by pushing or pulling on the free end of the covers by means of robots 16.

Figure 2:
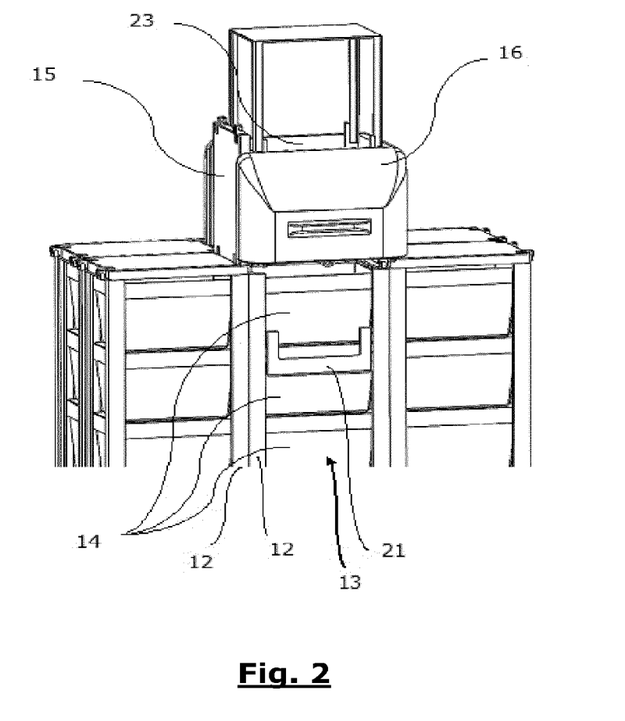
FIG. 2 is a view of a robot of the system shown in FIG. 1 positioned above a column to pick up a stack of bins.

FIG. 2 shows a robot 16 positioned above a column 13 to pick up a stack of bins 14 from a column 13, after tilting the cover 15 closing the column 13 vertically.

To pick up this stack of bins, this robot 16 has activated the descent of a frame 21 into the column 13. This frame 21 has an internal opening with a width greater than the external width of the bins 14, which allows it to slide around the bins 14.

The frame 21 is in this particular embodiment of the invention attached to racks driven by motorised pinions (not shown in FIG. 2). Rotation of the pinions in either direction drives the racks downwards or upwards, allowing the frame 21 to slide vertically in the column 13 around the bins 14.

Figure 3:
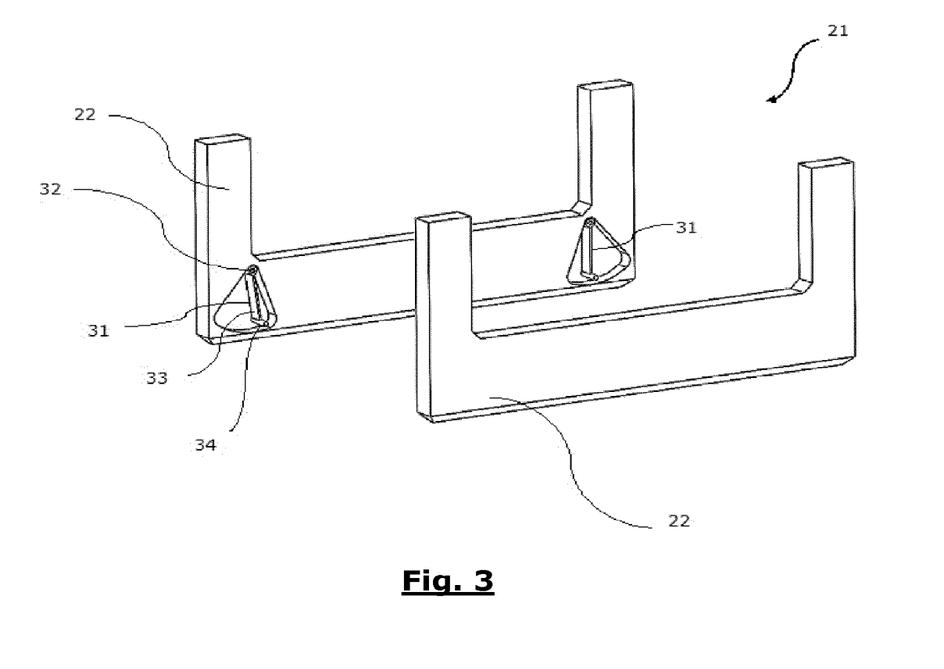
FIG. 3 is a detailed perspective view of a frame equipped with hooks of a robot of the system shown in reference to FIG. 1, shown alone.

In this particular embodiment of the invention, the frame 21 is formed by two vertical "U" shaped plates 22 facing each other, as can be seen in FIG. 3 where the frame 21 is shown alone.

Four hooks 31 are pivotally mounted at the four corners of the frame 21 about a transverse axis 32, below which they hang. These hooks 31 are intended to cooperate with lugs 41 formed integrally with the bins 14, an illustration of which can be seen in FIG. 4, which is a perspective view of an insulated bin of substantially parallelepipedal external shape. These hooks 31 have a rod-like body 33 at the free end of which a pin 34 projects at right angles and extends parallel to the axis of rotation 32 of the hook 31.

Figure 4:
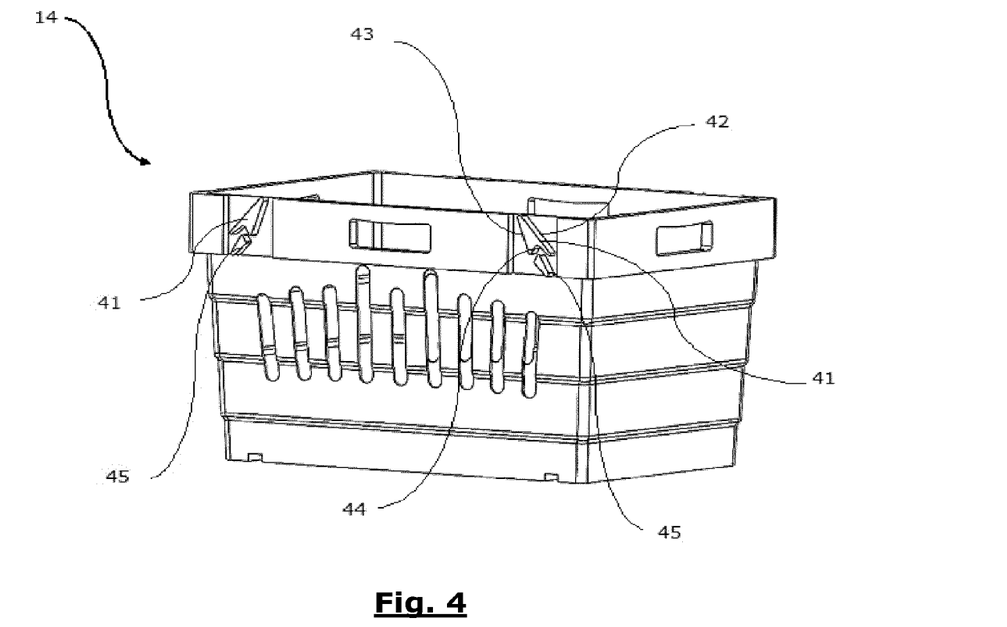
FIG. 4 is a perspective view of a bin of the system shown in reference to FIG. 1, shown alone.

As can be seen in FIG. 4, the lugs 41 are formed protruding from the upper edge of the longer side faces of the bin 14, in the vicinity of the upper corners thereof. The lugs 41 formed on the same face are identical in shape and face in opposite directions and are symmetrical with respect to a transverse plane of the bin 14.

These lugs 41 have in their upper part, in their thickness, two tilted planes 42 and 43 meeting at a point 46 which are connected in their lower part by a curved locking housing 44, turned downwards, the section of which is in the shape of a hyperboloid branch. It should also be noted that the upper tilted plane 42 faces upwards.

A tongue 45 of substantially the same thickness as the lug 41 is also formed to project from the upper contour of the bin 14, below the locking housing 44. This tongue 45 forms a guiding stop which makes it possible to push the free end of the hooks 31 of the frame 21 against the locking housing 44 when it is substantially at the level of the locking housing 44 of the lugs of a bin 14.

Figure 5:
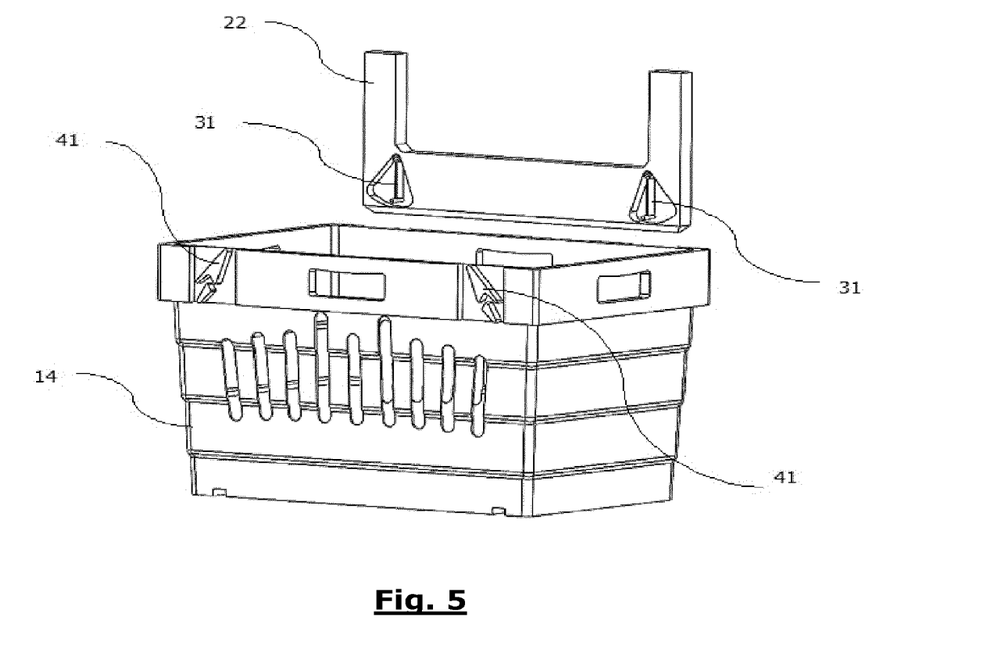
FIG. 5 illustrates a step of picking up a stack of bins by a robot of the system shown in reference to FIG. 1, when the frame is lowered by the robot.
Figure 6:
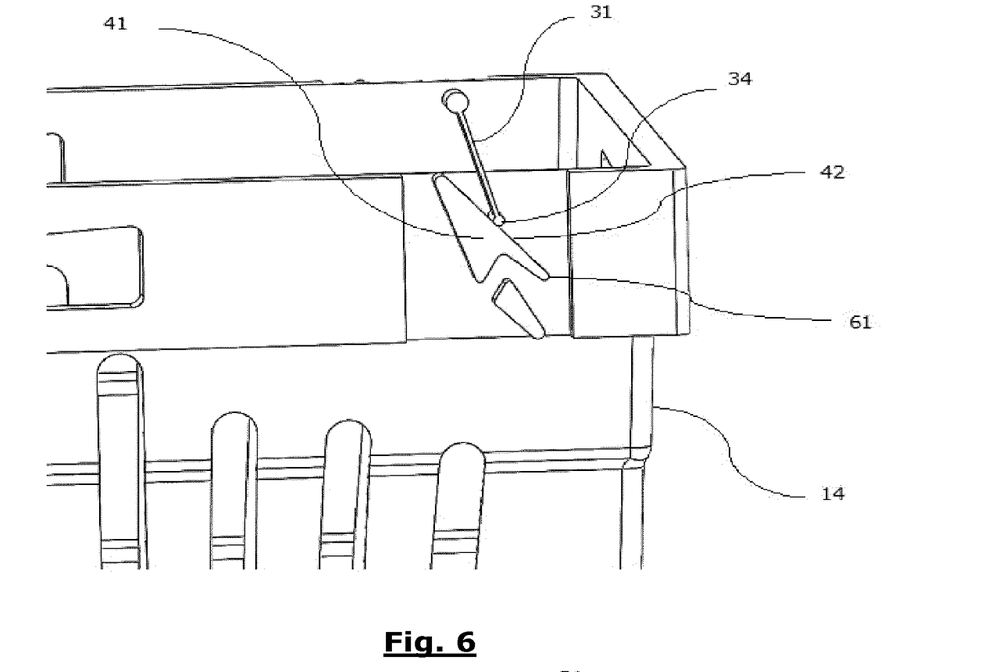
FIG. 6 illustrates a further step in the removal of a stack of bins by a robot of the system shown in FIG. 1, when the frame is lowered by the robot.
Figure 7:
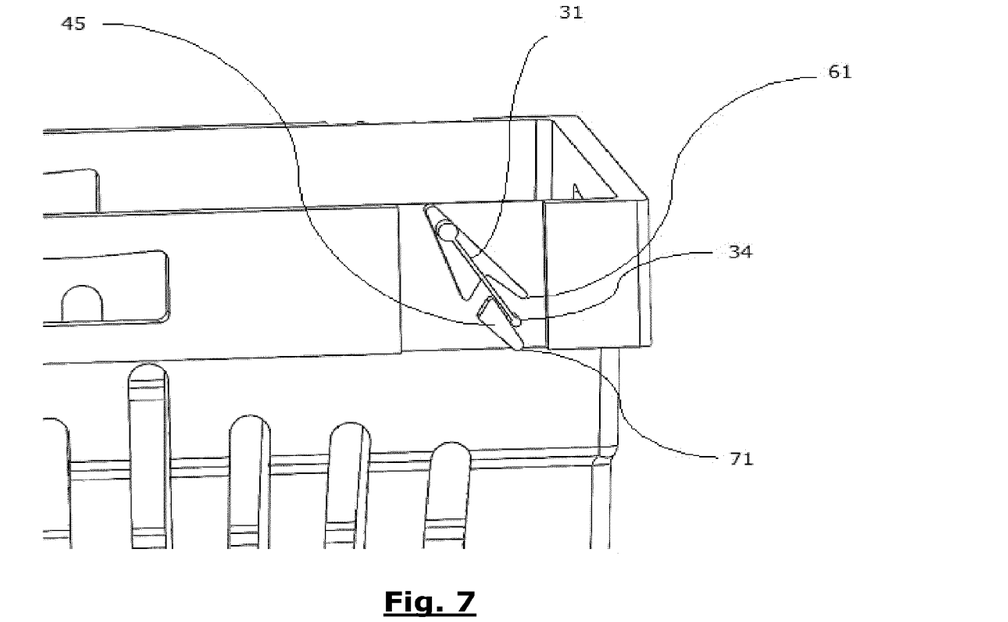
FIG. 7 illustrates yet another step in the removal of a stack of bins by a robot of the system shown in FIG. 1, when the frame is raised and after the hooks have passed the lower end of the tilted plane of the lugs.
Figure 8:
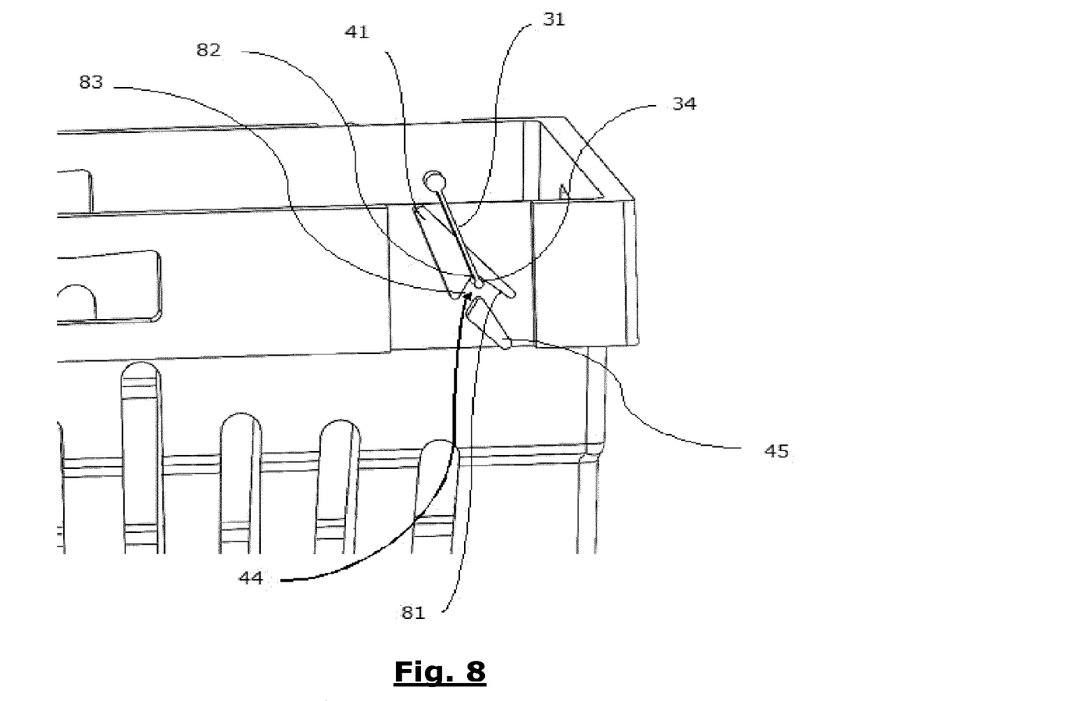
FIG. 8 illustrates a further step of picking up a stack of bins by a robot of the system shown with reference to FIG. 1, in which the robot frame lifts the stack of bins.

FIGS. 5 to 8 illustrate different steps in the picking of a stack of bins from a storage column 13 by a robot 16 positioned above the column 13. For the sake of readability, only a lug 41 of a bin 14 and a hook 31 are shown in FIGS. 6 to 8.

As can be seen in FIG. 5, in a detail view where only a plate 22 of the frame 21 is shown, when the frame 21 starts to descend into the storage column, the hooks 31 then hang vertically over the lugs 41 of the bin 14 placed at the top of the stack of bins to be picked.

As the frame continues to descend and the pin 34 at the free end of the hooks 31 reaches the lugs 41, it gradually slides down the tilted plane 42 (see FIG. 6), pushing the free end of the hook 31 out of the bin and causing the hook 31 to tilt upwards.

As the frame 21 continues to descend and the pin 34 passes under the lower end 61 of the tilted plane 42, the hook 31 tends to swing back into a vertical position and first comes to rest on the tongue 45 (see FIG. 7), then as the pin passes under the lower end 71 of the tongue 45, it resumes a vertical position. If the frame 21 is lowered further, the pin 34 will come to rest on a lug 41 of the next bin in the stack and will gradually be pushed outwards by the lug 41 of that bin and so on.

If, on the other hand, the frame 21 is commanded to rise, immediately after the pin 34 has passed the lower end 61 of the tilted plane 42, the pin 34 will be pushed by the tongue 45 against the outermost profile 81 of the locking housing 44 and will slide progressively along the latter. It should also be noted that in this particular embodiment of the invention, the tongue 45 also makes it possible to keep the hook 31 tilted and tilted upwards. When the frame 21 continues to rise and the pin 34 is positioned at the highest point 82 of the locking housing 44 (see FIG. 8), the hook 31 then lifts the bin 14 with which it is engaged and the bins placed above it, which makes it possible to raise this stack of bins up to the level of the robot traffic area, above the storage column. It should be noted that an opening 23 is provided in the robot chassis to allow the stack of bins to pass through when it is raised with the aid of the frame 21.

The robot 16 can then back up to rest the cover 15 over the column and move to a new column 13 where it has been instructed to deposit the bin stack or to a deposit column 17, where the bin stack 14 is lowered by operating the movement of the frame 21 and deposited on a lift (not shown in FIG. 1) located at the base of the deposit column 17 to be transported to a delivery station.

Figure 9:
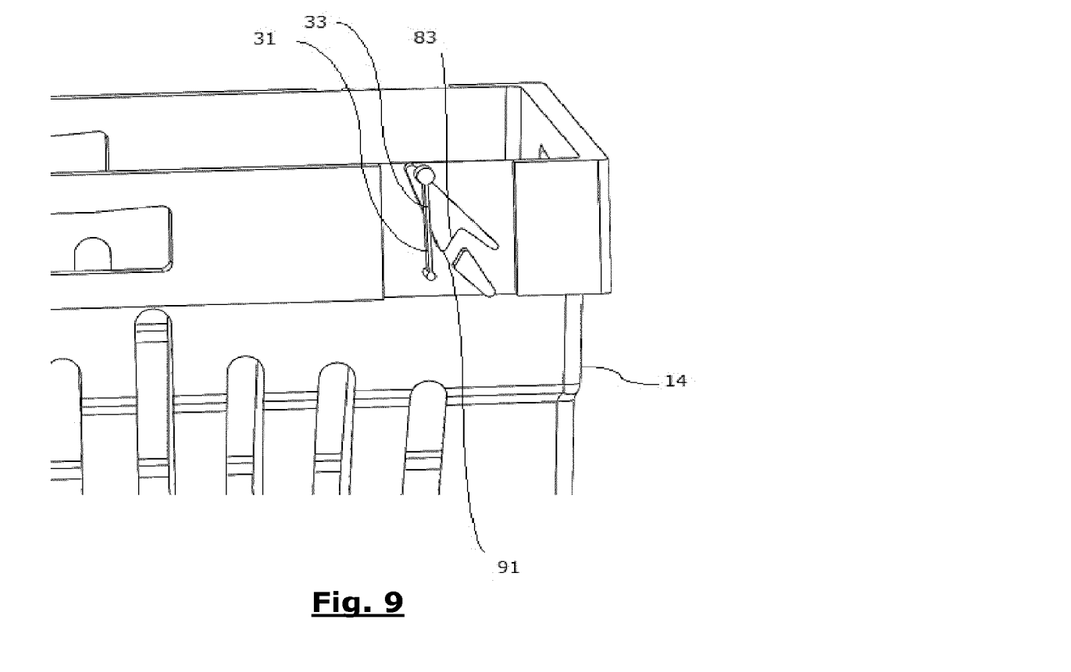
FIG. 9 illustrates a step in the removal of a stack of bins from a column, in which the hooks are released from the stack of bins.
Figure 10:
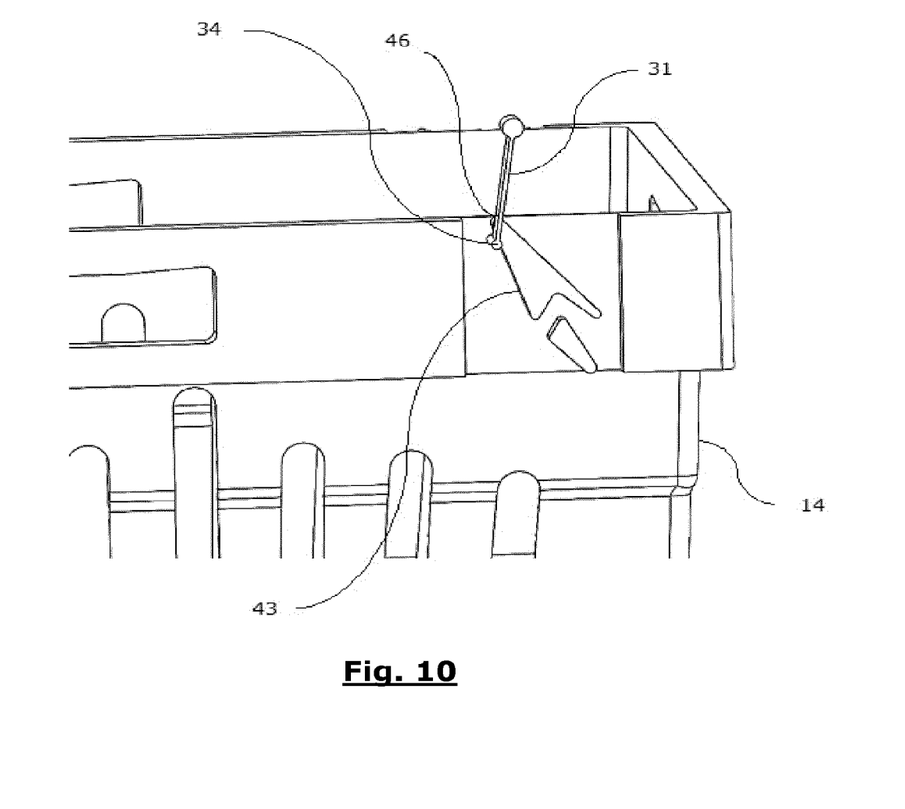
FIG. 10 illustrates another step of depositing a stack of bins in a column, in which the robot frame moves up the stack of bins.

FIGS. 9 and 10 illustrate the steps of depositing a stack of bins, which has been picked up by a robot from one column, into another storage column.

After tilting the cover 15 covering the storage column in which the stack of bins is to be deposited to the vertical, the robot, which is positioned above this storage column, activates the lowering of the frame 21 supporting the stack of bins 14. In this first step, the hooks 31 are locked in the lugs 41 of the lower bin of the stack, in the position shown in FIG. 8.

When the bottom bin of the stack of bins touches the bottom of the column 13 or comes into contact with a stack of bins already stored in the column, the frame 21 is moved downwards again so that the hooks 31 can be released from the lugs 41 of the bottom bin of the stack. The pin 34 which was positioned at the top point 82 of the lock housing then slides progressively downwards along the inner profile 83 of the lock housing 44.

In this particular embodiment of the invention, it should be noted that a return spring, or leaf spring, (not shown in the figures) may be mounted on the axis of rotation of the hooks to facilitate the return of the hooks 31 to a vertical position and hold them there.

When the frame 21 has been lowered sufficiently and the pin 34 is released from the locking housing 44, the hook 31 returns to a vertical position (see FIG. 9). The robot 16 can then actuate the raising of the frame 21. The pin 34 then moves up along the lug 41 sliding against the lower tilted plane 43 of the lug 41 (see FIG. 10), which pushes the hook 31 back into the lug 41 while tilting it upwards, until it reaches the upper tip 46 of the lug 41. In this particular embodiment of the invention, it should be noted that when the pin 34 passes under the inner end 91 of the inner profile 83 of the locking housing 44, the rod 33 of the hook 31 is in a vertical position.

The frame 21 then continues to rise and the pin 34 is released from the lug 41, allowing the hook 31 to return to a vertical position, until it meets the lug 41 of the bin on top of the previous bin and is pushed inwards again and so on until the frame 21 comes out of the column 13 and the robot 16 can move on the grid again.

Figure 11:
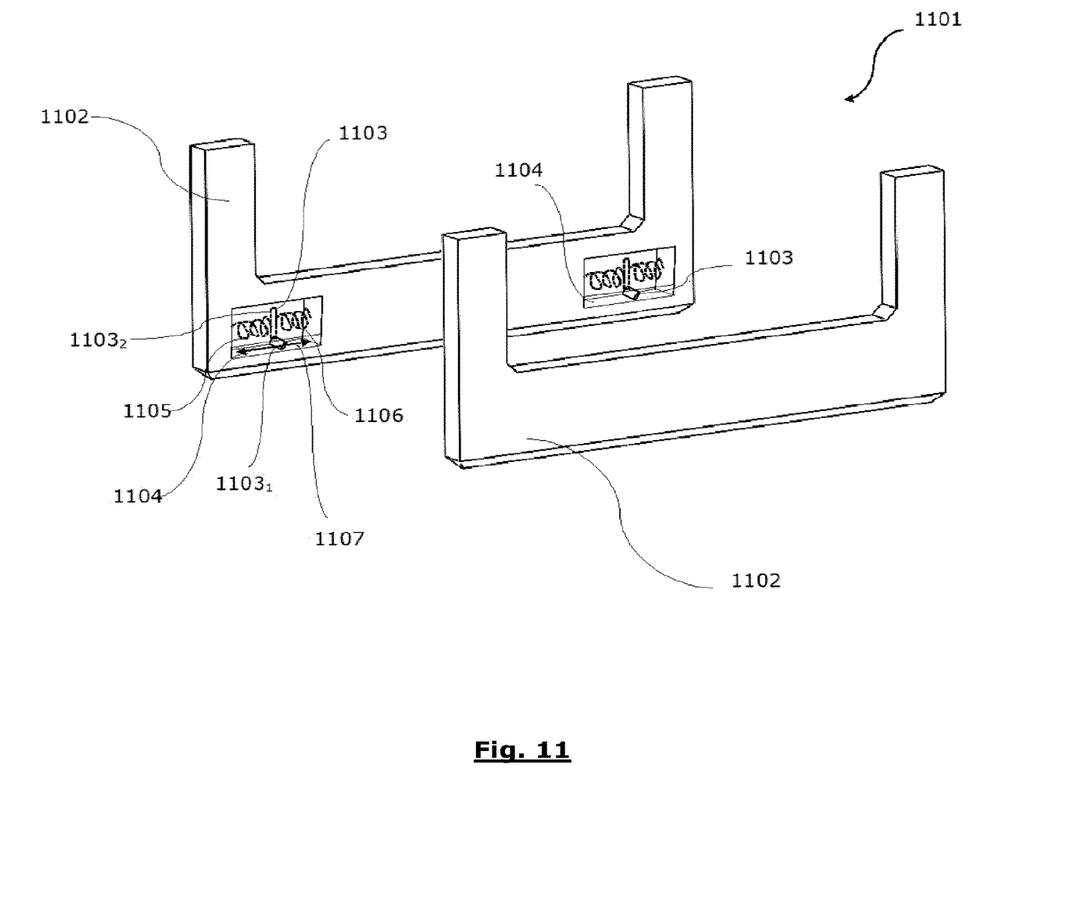
FIG. 11 is a representation of another embodiment of a frame fitted to a robot of a system according to the invention.

FIG. 11 shows an alternative implementation of a frame 1101 for picking up bins.

This frame 1101 is formed by two vertical plates 1102 in a "U" shape facing each other, each equipped with two movable fingers 1103 substantially at their corners, the head 1103$_1$ of which projects out of the plates 1102 and is guided in translation in a slide 1104 oriented in the plates 1102 and oriented in the horizontal direction (represented by the double arrow 1107 in FIG. 11).

The inner body 11032 of the fingers 1103 is mounted between two substantially identical return springs 1105 and 1106 disposed on either side thereof. These springs tend to return the fingers 1103 to a stable equilibrium position substantially coincident with the centre of the slide 1104, when the fingers are moved away from their equilibrium position by being pushed to either side of the centre of the slide 1104.

These fingers are intended to cooperate with lugs formed on the bins 14, to enable one or more bins to be picked up with the frame 1101.

An exemplary embodiment of the present disclosure aims to overcome the above-mentioned short-comings of the state of the art.

More specifically, an exemplary embodiment provides a technique for storing and retrieving products that allows rapid and reliable removal of products from storage.

An exemplary embodiment provides such a technique which is simple to implement and with reduced cost.

An exemplary embodiment provides such a technique that allows storage of products in bins of different heights.

Although the present disclosure has been described with reference to one or more examples, workers skilled in the art will recognize that changes may be made in form and detail without departing from the scope of the disclosure and/or the appended claims.

The invention claimed is:

1. An automatic product storage and retrieval system comprising:
   a plurality of bins for receiving products;
   a storage facility for said bins comprising a plurality of storage columns arranged in a grid and configured to receive a vertical stack of said plurality of bins, and
   at least one robot which operates above said grid, capable of transporting said bins and picking up and depositing said bins in said columns, said robot comprising a gripping and lifting element to grip and lift at least one bin and comprising a mobile support configured so as to be able to slide vertically around said bins,
   wherein the gripping and lifting element comprises at least one substantially vertically extending element, mounted so as to be movable relative to said support between:
      a stable equilibrium position in which a lower end of said vertically extending element is not subject to action of any horizontal thrust or a resultant of horizontal thrust forces acting on the lower end of said member is zero; and
      at least one out-of-equilibrium position, in which the resultant of the horizontal thrust forces on the lower end of said vertically extending element is non-zero, and the lower end of said member is displaced to either side of its position in said equilibrium position,
   and wherein said bins have at least one lug having a locking housing substantially facing downwards for locking said vertically extending element in said stable equilibrium position, and a tilted portion substantially facing upwards allowing the lower end of said vertically extending element to be pushed back towards the outside of said bin, in one of said out-of-equilibrium positions, when said support moves downwards.

2. The system according to claim 1, wherein said movable vertically extending element is a hook for hanging from said support, pivotally mounted about an axis relative to said support.

3. The system according to claim 1, wherein said movable vertically extending element is a finger guided in translation in a horizontal slide and cooperating with one or more return springs in said stable equilibrium position.

4. The system according to claim 2, wherein the gripping and lifting element comprises four vertically extending elements movable relative to said support and said lugs have four lugs, said lugs being positioned relative to each other so that when said support moves around a bin or stack of bins each of said movable members is substantially opposite one of said lugs of the bin or bins in the stack.

5. The system according to claim 1, wherein said locking lug is formed integrally with said bins.

6. The system according to claim 2, wherein said hook is formed by a rod having a lug projecting from one side substantially at a free end of said rod.

7. The system according to claim 1, wherein said tilted portion comprises a tilted plane.

8. The system according to claim 1, wherein said locking housing has a curvature in the form of a hyperbolic branch, a parabola or a truncated ellipse.

9. The system according to claim 1, wherein said bins have guide stops opposite said lock housings for pushing said movable vertically extending element against said lock housing.

10. The system according to claim 1, wherein said gripping and lifting element comprises at least one rack or a plurality of cables attached to said support and an actuator means for actuating said rack or said cables to raise or lower said support.

11. The system according to claim 1, wherein a chassis of said robot has an opening allowing passage of said support through said chassis to be able to lift a bin or stack of bins from above said chassis or vice versa to deposit a bin or stack in a column below said robot through said opening.

12. A method comprising:
gripping by a robot a stack of bins in a storage column of a storage installation comprising a plurality of storage columns arranged in a grid, said robot operating above said grid and comprising a gripping and lifting element to grip and lift at least one bin comprising a mobile support configured so as to be able to slide vertically around said bins and at least one movable element movable which is with respect to said support between:
a stable equilibrium position in which a lower end of said movable element is not subject to action of any horizontal thrust or a resultant of the horizontal thrust forces acting on the lower end of said member is zero; and
at least one out-of-equilibrium position, in which the resultant of the horizontal thrust forces on the lower end of said movable element is non-zero, and the lower end of said member is moved to either side of its position in said equilibrium position,
said bins in said stack having at least one lug having a substantially downwardly facing locking housing for said movable element and a substantially upwardly facing tilted portion for pushing the free end of said movable element outwardly of said bin as said support moves downwardly,
moving said support around downwardly around said stack to a height at a bottom of the stack where said movable element is engaged in said locking housing of said bottom of the stack bin lug; and
from said height, moving said support up to an upper level of said column, causing said stack to be lifted out of said column.

13. The system according to claim 1, wherein the mobile support is a frame.

14. The system according to claim 1, wherein the mobile support is an arm.

* * * * *